Nov. 29, 1966 W. R. JOHNSON 3,289,095

EQUALIZER CIRCUIT

Filed Feb. 15, 1966 2 Sheets-Sheet 1

United States Patent Office 3,289,095

Patented Nov. 29, 1966

3,289,095

EQUALIZER CIRCUIT

Wayne R. Johnson, Woodland Hills, Calif., assignor to Winston Research Corporation, a corporation of California Filed Feb. 15, 1966, Ser. No. 527,593
4 Claims. (Cl. 330—69)

The present application is a continuation-in-part of applicant's copending application Serial No. 228,887, filed October 8, 1962, now abandoned.

The present invention relates to magnetic tape recorder systems and mechanisms and it relates more particularly to an improved equalizer circuit for particular use in magnetic recording and reproducing systems, but which has general application.

Magnetic tape recording, as is well known, involves the recording of information on a tape which is coated with a magnetizable substance, such as ferromagnetic powder. At present, the most widespread use of magnetic recording has been in conjunction with sound signals. However, magnetic recording is becoming widely used in conjunction with the storage of other information, such as television signals, telemetry signals, and so on.

Although the concept of recording intelligence on a magnetic tape or wire is old, it is only in recent years that techniques and materials have been developed which make possible the high quality recording and reproduction of sound signals from the standpoint of an appropriate wide frequency range, favorable signal-to-noise ratio, and low distortion.

The magnetic tape recording and reproducing systems in the present-day prior art usually include a corrective electrical network called an "equalizer circuit" to provide the desired wide band recording and reproducing characteristics. The prior art equalizer circuit provides high-frequency emphasis and it is used to compensate for the inherent loss in response of the electromagnetic transducer head at the high-frequency end of the range.

The loss in response of the recording and/or reproducing head at the high-frequency end of the range is due to many factors, including the finite width of the air gap in the magnetic core of the head, eddy current losses, losses due to the spacing of the magnetic tape from the head, and so on. The response of the usual magnetic head is equivalent to a low-pass filter and the high-frequency attenuation of the equivalent filter is a function of the gap width. The prior art equalizer circuit provides the linear phase, high-frequency emphasis required for compensation of the high-frequency drop in response of the usual record/reproduce head.

However, since the output voltage from the reproducing head is proportional to the rate of change of the flux ($d\phi/dt$) in the magnetic core of the head, the response of the reproducing head also tends to vary directly and linearly with frequency, having a relatively low value at relatively low frequencies, but this characteristic is modified in the system by the high-frequency drop-off in the response characteristics of both the recording and reproducing heads due to the factors discussed above. Therefore, in such systems of the prior art, it has been customary to include a low-pass filter network to compensate for the drop-off in the response of the system at the lower frequencies. Both the high-frequency emphasis circuit and the low-pass filter network effect a certain amount of attenuation of the translated signal, the cumulative over-all loss of response in typical prior art systems being of the order of 40 db.

It is, accordingly, an object of the present invention to provide an improved equalizer circuit which exhibits response characteristics so as to compensate for both the high-frequency and low-frequency response drop-offs of associated electromagnetic transducer heads, as well as other associated transducer or electrical or electronic equipment which may have nonlinear frequency-response characteristics.

Another object of the invention is to provide such an improved equalizer circuit which obviates the need for a separate low-pass filter circuit, and the additional over-all attenuation attendant thereon, for the compensation of the low-frequency drop-off in the response of the associated reproducer head.

Another object is to provide such an improved equalizer circuit which compensates for the aforementioned high-frequency and low-frequency response drop-offs of the associated transducer heads and other associated equipment and achieves this without reducing to any material extent the over-all response of the system over that required for high-frequency compensation alone.

A general object of the invention is to provide an improved equalizing circuit which exhibits linear phase, low-frequency and high-frequency response emphasis, as is particularly required for the compensation of the normal response of electromagnetic transducers.

Other objects and advantages will become apparent upon a consideration of the following description, when taken in conjunction with the accompanying drawings, in which.

Although an equalizer circuit constructed in accordance with one embodiment of the invention is illustrated as being included in a magnetic tape reproducing system, it will become apparent, as the description proceeds, that the improved equalizer circuit may also be used in a magnetic tape recording system. In fact, the improved circuit of the invention may be used in any system requiring high-frequency and low-frequency emphasis with a minimum of over-all attenuation.

Figure 1:
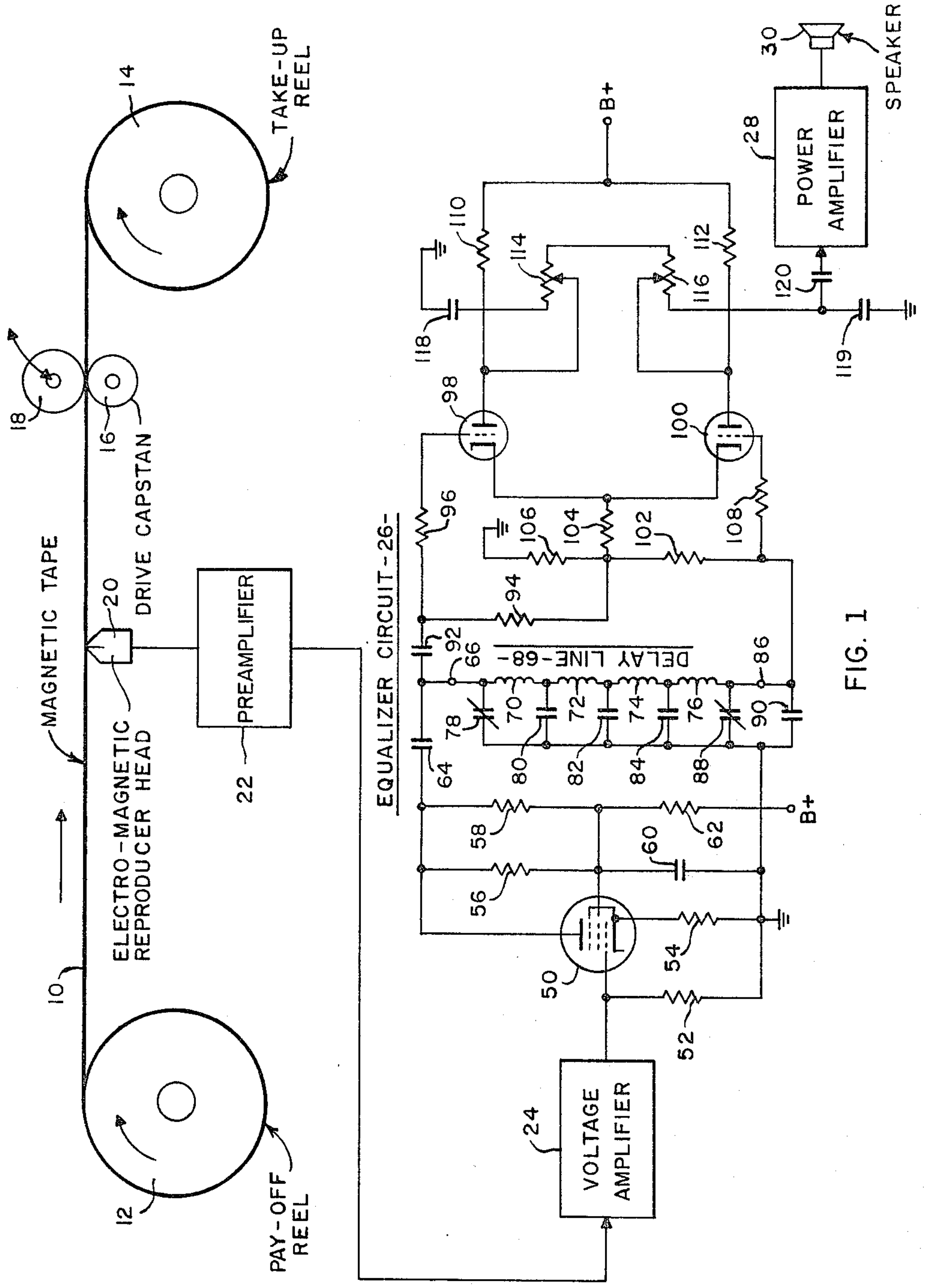
FIG. 1 is a schematic representation of a tape recorder reproducing system for reproducing intelligence recorded on a magnetic tape, and which includes an improved equalizer circuit constructed in accordance with one embodiment of the invention.

The tape recorder reproducing system of FIG. 1 includes a magnetic tape 10 which is drawn from a usual pay-off reel 12 and onto a take-up reel 14. The reels 12 and 14 are driven by usual electromagnetic motor-breaking mechanisms (not shown) and the tape is drawn from the reel 12 to the reel 14 by a usual drive capstan 16.

The drive capstan 16 may be continuously driven by any suitable drive motor (not shown). The drive capstan 16, in accordance with known practice, is selectively clutched to the tape by a movable idler puck 18. The puck 18 is rotatably mounted and it is disposed on the opposite side of the tape 10 from the drive capstan 16. When the puck 18 is moved from its stand-by to its operative position, the tape 10 is squeezed between the puck and the drive capstan and the drive capstan then draws the tape from the reel 12 to the reel 14.

Appropriate electromagnetic transducer heads (not shown) are disposed adjacent the tape 10. These heads may include, for example, appropriate recording and erasing heads. A reproducer head 20 is also disposed adjacent the magnetic tape and this head serves to sense the magnetic recordings on the tape and to transform these recordings, in usual manner, into electrical signals.

The electrical signals from the reproducer head 20 are applied to a usual pre-amplifier 22 and the signals from the pre-amplifier 22 are further amplified in a voltage amplifier 24. The amplified signals from the voltage amplifier 24 are passed through an equalizer circuit 26 to a power amplifier 28. The power amplifier 28 is coupled to a usual speaker 30. The equalizer circuit 26 is generally similar to the aperture corrector circuit at page 16–118 (FIGURE 16–129) of "Television Engineering Handbook," Donald G. Fink, First Edition, 1957. However, the circuit is modified in accordance with the concepts of the invention, as will be described.

As noted above, the equalizer circuit 26 is modified in accordance with one embodiment of the invention so as to provide both low-frequency and high-frequency emphasis to the signals passed through the circuit and to achieve this with minimum attenuation in the over-all response of the system.

Figure 2:
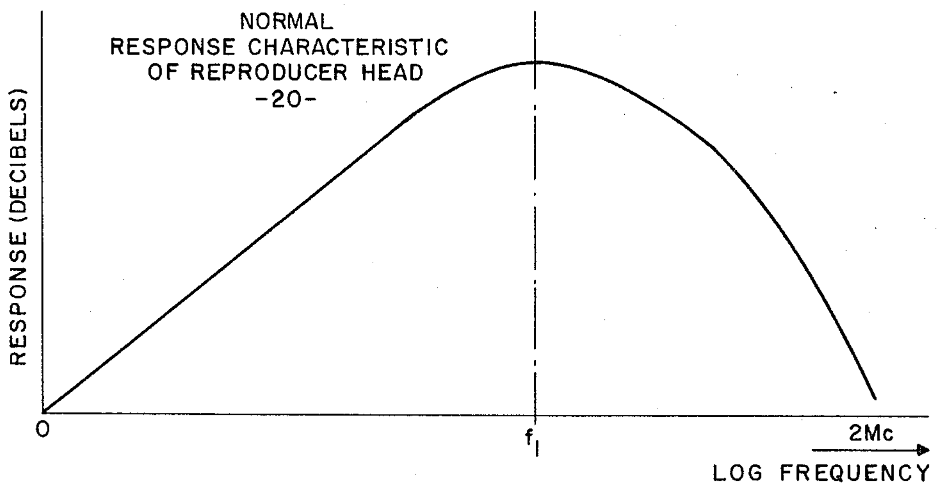
FIG. 2 is a curve representing the response characteristic of a typical electromagnetic reproducer head.

The electromagnetic reproducer head 20 exhibits a response characteristic such as shown in FIG. 2. The response characteristic of the reproducer head drops off at the high-frequency end of the range due to head spacing, gap width, eddy current losses, etc., as mentioned above. Also, the response characteristic of the head drops towards the low-frequency end of the range (as shown in FIG. 2) due to the fact that the head responds to the rate of change of the flux ($d\phi/dt$) in its magnetic circuit, as also mentioned above.

The equalizer circuit 26, in accordance with the concepts of the invention, serves to compensate for both the high-frequency and low-frequency drop-off in the response of the head 20. This is achieved by providing a compensating emphasis at the low-frequency and high-frequency ends of the response band of the equalizer circuit. The result is that the system of FIG. 1 exhibits a substantially uniform response over the entire frequency range of the signals reproduced by the head 20 and this is achieved without a material decrease in the over-all response of the system over that due to the high-frequency compensation.

The equalizer circuit 26 includes an electronic repeater device 50 which is included in the input circuit. The device 50 may be a constant-current pentode of the type presently designated 6AH6. The output from the voltage amplifier 24 is applied to the control grid of the pentode 50. The control grid of the pentode is connected to a grounded resistor 52 and the suppressor grid is connected to the cathode which, in turn, is connected to a grounded resistor 54. The grounded resistor 54 may, for example, have a resistance of 150 ohms.

The anode of the pentode 50 is connected to a resistor 56 and to a resistor 58. The resistor 56 is connected to the screen grid and to a grounded capacitor 60. The resistor 58 is also connected to the screen grid and the latter resistor is connected to a resistor 62 which, in turn, is connected to the positive terminal B+ of a unidirectional potential source.

The resistor 56 may have a resistance of 10 kilohms, for example, and the resistor 58 may have a resistance of 9.1 kilohms. The capacitor 60 may have a capacitance of 40 microfarads, for example, and the resistor 62 may have a resistance of 1.50 kilohms.

The anode of the pentode 50 is also connected to a coupling capacitor 64 which, in turn, is connected to the input terminal 66 of a delay line 68. The delay line 68 is composed, for example, of a plurality of series inductance elements 70, 72, 74, and 76 and shunt capacitors 78, 80, 82, 84, 88, and 90, of which the capacitors 78 and 88 are adjustable to take into account variations in the distributed capacitances of the circuits connected thereto. These capacitors have a common ground connection, as shown. The capacitors 64, 78, 80, 82, 84, 88, ad 90 may have capacitances of 0.47, 40 to 300, 750, 750, 750, 70 to 450, and 270 microfarads, respectively.

In accordance with the present invention, the input terminal 66 of the delay line 68 is connected to a high-pass filter network composed of a capacitor 92 and resistors 94 and 106. The capacitor 92 may, for example, have a capacitance of .001 microfarad and the resistor 94 may have a resistance of 50 kilohms.

The junction of the capacitor 92 and resistor 94 is connected to a resistor 96 which may, for example, have a resistor of 100 ohms. The resistor 96 is connected to the control grid of a triode 98. The triode 98 and an additional triode 100 are connected as a differential amplifier. These triodes may be any well known type of electronic repeater, for example a vacuum tube of the type designated 6BQ7.

The output terminal 86 of the delay line 68 is further connected to a resistor 102. This resistor may, for example, have a resistance of 1 megohm and it is connected to the junction of a resistor 104 and a grounded resistor 106. The resistors 104 and 106 serve as a common cathode load for the triodes 98 and 100. Resistor 104 may have a resistance, for example, of 150 ohms. The resistor 106, on the other hand, may have a resistance of 270 ohms.

The output terminal 86 of the delay line 68 is also connected to a resistor 108. The resistor 108 may have a resistance of 100 ohms and it is connected to the control grid of the triode 100.

The anode of the triode 98 is connected to a resistor 110 which, in turn, is connected to the positive terminal B+ of the unidirectional source. The anode of the triode 100 is connected to a similar resistor 112 which, likewise, is connected to th epositive terminal B+. Each of the resistors 110 and 112 may have a resistance, for example, of 4.7 kilohms.

The anode of the triode 98 is further connected to the movable arm of a potentiometer 114 and the anode of the triode 100 is connected to the movable arm of a potentiometer 116. Each of the potentiometers 114 and 116 may have a maximum resistance, for example, of 250 ohms.

One of the fixed terminals of the potentiometer 114 is connected to a fixed terminal of the potentiometer 116. The other fixed terminal of the potentiometer 114 is connected to a grounded capacitor 118. The other fixed terminal of the potentiometer 116 is connected to a grounded capacitor 119 and to a coupling capacitor 120. Each of the grounded capacitors 118, 119 may have a capacitance of 40 microfarads. The capacitor 120 may, for example, have a capacitance of 1 microfarad. The coupling capacitor 120 couples the equalizer circuit 26 to the power amplifier 28.

The pentode 50 serves further to amplify the signals from the voltage amplifier 24. These signals extend through a predetermined frequency range and they represent the signals produced by the reproducer head 20. The amplified signals from the pentode 50 are applied to the delay line 68. This delay line has a half-wave electrical length at a wavelength corresponding to the high-frequency end of the response band of the system. The delay line 68 is terminated at its input end only by the resistors 56 and 58, effectively presenting to the delay line its characteristic impedance, so that reflections from its unterminated output end cause the response of the equalizer circuit at the input end to follow a cosine function of $(1-k\omega\tau)$ where $\tau$ is the time delay of the delay line and $\omega$ the angular frequency for any given signal component.

The signals from each end of the delay line 68 are fed to the differential amplifier formed by the circuitry of the triodes 98 and 100. The potentiometers 114 and 116 serve as a gain control for the system.

Figure 3:
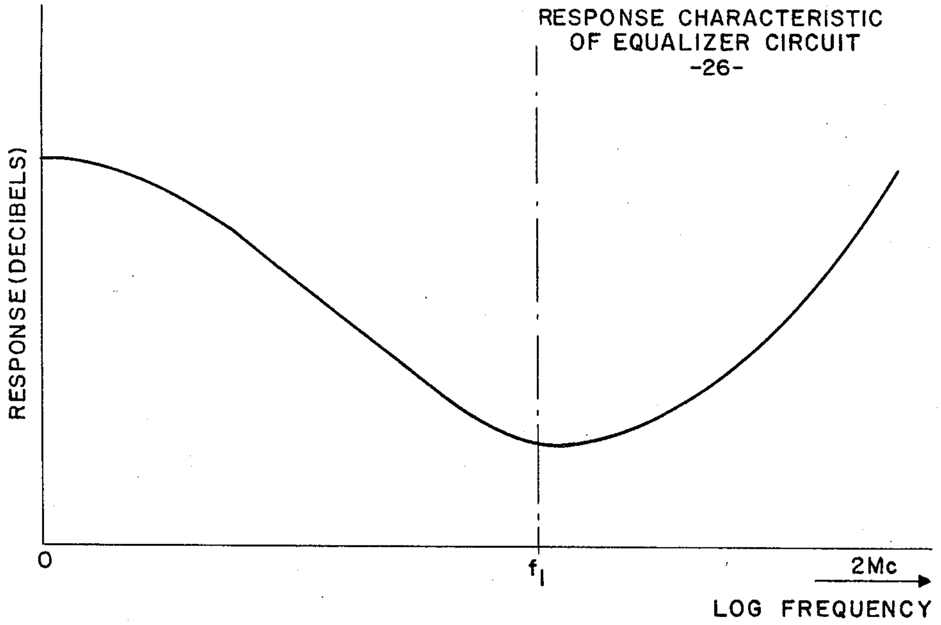
FIG. 3 is a curve representing the compensating response characteristic of the improved equalizer circuit of the invention.

As explained in the aforementioned Handbook, the use of the delay line 68 having a half-wave electrical length at the high-frequency end of the response band of the system in conjunction with the differential amplifier of the triodes 98 and 100 provides a circuit having high-pass-band characteristics. This circuit has been designed to have a response characteristic which rises with increase in frequency, as shown in FIG. 3, for frequencies above the frequency $f_1$ and is substantially uniform for frequencies below $f_1$, where $f_1$ is the frequency of the peak response of the reproducer head, unequalized.

As mentioned above, compensation for the low frequency drop in the response characteristic of the reproducer head, as shown in FIG. 2, is provided in the prior art systems by the provision of a separate low-pass filter. However, such a filter causes additional attenuation in the system. In the system of the present invention, the high-pass filter 92, 94, 106 is included in the input circuit to triode 98 of the differential amplifier in the equalizer circuit. This high-pass filter causes the response of the differential amplifier to vary inversely with frequency, causing the overall response of the system to rise with decreasnig frequency, as represented in FIG. 3, for frequencies below $f_1$.

The equalizer circuit of the present invention is predicated on the concept, therefore, of providing low-frequency emphasis, not by the provision of separate attenuating means for the high-frequency signals but by decreasing the effectiveness of the equalizer circuit in its attenuation of the low-frequency signals. In this manner, both high-frequency and low-frequency emphasis is provided with an over-all attenuation substantially less than that encountered in the prior art circuits of this general type.

The use of the improved equalizer circuit of the invention, therefore, causes a tape recorder-reproducing system including the reproducing system of FIG. 1 to exhibit an essentially flat response characteristic over the entire range of signals derived by the head 20 from the magnetic tape 10. Moreover, this essentially flat response characteristic is achieved without decreasing materially the over-all response of the system as compared with the attenuation of the prior art system equalizer circuits for high-frequency compensation only. As explained above, the low-frequency compensation in the prior art systems is usually carried out by separate low-pass filter circuits which impart an additional over-all attenuation of the order, for example, of 40 decibels to the system. The improved circuit of the invention completely obviates such as additional attenuation in its provision for low-frequency emphasis, as explained above.

As noted above, although the equalizer circuit of the invention finds particular utility in magnetic recording and reproducing systems, the circuit will find general application wherever a linear phase, low-frequency and high-frequency response emphasis with low over-all attenuation is required.

While a particular embodiment of the invention has been described, modifications may be made and the following claims are intended to cover all such modifications which fall within the scope of the invention.

What is claimed is:

1. An equalizer system for passing signals extending through a predetermined frequency range and for providing an increasing response characteristic at both the high and low ends of said predetermined frequency range, said equalizer system including: a differential amplifier having first and second electronic signal repeaters; an input circuit coupled to said first and second repeaters and having a delay network controlling the signals applied to said first and second repeaters so as to cause said differential amplifier to exhibit a response increasing with increasing signal frequencies and a substantially uniform response to signal frequencies below a given frequency; and a high-pass filter network coupled between said input circuit and one of said repeaters for causing said differential amplifier to exhibit a response increasing with decreeasing signal frequencies.

2. An equalizer system in accordance with claim 1 in which said delay network has an electrical length equal to a half wavelength at the high-frequency end of said frequency range.

3. An equalizer system in accordance with claim 1 including means for terminating said delay network substantially in its characteristic impedance solely at its input end so that reflections set up in said delay network cause the response of said differential amplifier to follow the function cos $(1-\omega\tau)$ where $\tau$ is the time delay of the delay network and $\omega$ is the angular frequency for any given signal component.

4. An equalizer system in accordance with claim 1 in which one end of said delay network is coupled to said input circuit and to one of said signal repeaters and the other end of said delay network is coupled to the other of said signal repeaters.

No references cited.

ROY LAKE, *Primary Examiner.*

N. KAUFMAN, *Assistant Examiner.*